UNITED STATES PATENT OFFICE.

WILLIAM HARROLD SMITH, OF CHICAGO, ILLINOIS.

AN ARTICLE FOR CATTLE-FOOD.

SPECIFICATION forming part of Letters Patent No. 233,886, dated November 2, 1880.

Application filed August 2, 1880. (No specimens.)

*To all whom it may concern:*

Be it known that I, WILLIAM HARROLD SMITH, of Chicago, in the county of Cook and State of Illinois, have invented a new and Improved Article for Cattle-Food; and I do hereby declare that the following is a full, clear, and exact description of my invention, which will enable others skilled in the art to which it appertains to make and use the same.

This invention relates to an improved food for cattle made from bran.

I take bran and, without addition of any substance which will cause its particles to cohere, heat the same in any suitable apparatus to, say, 150° Fahrenheit, or more, care being taken to have the heat uniform throughout the mass, and that the bran shall not be burned. While the bran is thus heated I place it in a strong mold and forcibly compress it to one-eighth or one-tenth its original bulk, using for this purpose a powerful steam-hammer. The gluten being softened by the heat, the bran thus compressed will be self-coherent and form a solid mass when removed from the mold. I employ the term "self-coherent" to express the fact that the mass coheres by reason of its own constitution, in contradistinction to cohesion which results from the addition or admixture of some foreign substance.

I am aware that heretofore bran has been compressed, while cold, into bags and bales or inclosures for the purposes of transportation or storage; but in that case there is no cohesion of its particles; it is susceptible to deterioration by atmospheric causes, and to waste during transportation or handling.

I am also aware that bran has been compressed in solid blocks with the addition of moisture, whereby the gluten is softened; but in that case the bran is injured by discoloration and liability to fermentation and mold due to the presence of moisture. My invention differs from these in the solid and anhydrous condition of the block.

A block of this solid bran is always ready for use, and if put into a bucket of water will absorb the water and quickly disintegrate and return to its original bulk in the form of mash, and in the proper condition to be fed to cattle. In this solid form the bran is, so to speak, in a kiln-dried condition, and not liable to fermentation, and, being greatly diminished in bulk, may be profitably stored or transported to great distances.

I do not herein claim the process of compacting vegetable substances by means of heat and pressure, because I have made that the subject of a separate application for a patent.

That which I claim as new is—

The new article herein described—that is to say, a self-coherent solid compressed block of bran, substantially as described.

WILLIAM HARROLD SMITH.

Witnesses:
H. M. MUNDAY,
EDMUND ADCOCK.